UNITED STATES PATENT OFFICE.

JONATHAN W. SHIVELEY, OF SARATOGA SPRINGS, NEW YORK.

IMPROVEMENT IN PREPARING MOSS FOR ORNAMENTAL BASKETS.

Specification forming part of Letters Patent No. 126,237, dated April 30, 1872.

Specification describing a new and useful Improvement in Preparing Moss for Ornamental and other Articles, invented by JONATHAN W. SHIVELEY, of Saratoga Springs, county of Saratoga, State of New York.

I propose to improve the natural moss of the South, "*Tillandsia usneaides*," popularly known as Louisiana moss, for various ornamental purposes, such as for moss flower-baskets, wreaths, bouquets, milliners' trimmings, &c., for which the said moss is naturally desirable on account of the long, graceful fibers and other ornamental features; which said improvement consists in coloring the said moss in gold, silver, copper, carmine, and other colors, by the application of bronze, metal, or mineral dust of any kind.

In carrying out my invention, I separate the moss, and tie it up in small switches or bunches, which I dip in any good mucilage, or any suitable gummy substance that will cause the bronze powder to adhere and will not injure the moss; then, when partly dried, after being removed from the mucilage bath I dust it with bronze, dust of gold, silver, copper, carmine, or other dust, according to the color required, and then I strip it through the hand or fingers, or brush or dress it in any suitable way to give a rich or glossy appearance. Or I may mix the bronze powder with the mucilage, and dip the moss in the compound two or three times, taking it out to dry each time, repeating the operation until a sufficient coating of coloring matter is obtained. If I wish to keep the moss soft and pliable, I steep it in hot or boiling water a few minutes, and then dip it into boiled linseed-oil previous to coloring, and then apply the color in the same manner as above described. In this case the hot water softens the moss, and opens the pores so that it absorbs the oil sufficiently to keep soft and pliable.

Having thus described my invention, I claim as new and desire to secure by Letters Patent—

1. The coloring of moss with bronze or other metal or mineral dust, sprinkled on a coating of mucilage, or other gummy matter, previously applied, or by dipping it in a bath of gummy matter and powder, and then drying it, and either stripping or dressing it to impart a glossy appearance or not, substantially as specified.

2. I also claim the process of steeping or boiling the moss in hot water, and then dipping it in linseed-oil preparatory to coloring it as above described, to keep it soft and pliable.

3. I also claim the new article of manufacture consisting of moss colored, as hereinbefore described, whether made soft and pliable by steeping and oiling or not, substantially as specified.

JONATHAN W. SHIVELEY.

Witnesses:
T. B. MOSHER,
ALEX. F. ROBERTS.